United States Patent [19]

Yamamoto et al.

[11] Patent Number: 4,883,834

[45] Date of Patent: Nov. 28, 1989

[54] PRIMER COMPOSITIONS

[75] Inventors: Shosaku Yamamoto; Kazuo Kakinuma, both of Yokohama; Fumio Sodeyama, Chigasaki; Junji Mayumi, Tsu; Riichiro Maruta, Yokkaichi, all of Japan

[73] Assignee: Nippon Oil and Fats Company, Limited, Japan

[21] Appl. No.: 72,423

[22] Filed: Jul. 13, 1987

[30] Foreign Application Priority Data

Jul. 21, 1986 [JP] Japan .................. 61-171183

[51] Int. Cl.$^4$ .................. C08L 51/34; C08L 53/01
[52] U.S. Cl. .................. 524/504; 525/66; 525/83; 525/84; 525/95; 524/505
[58] Field of Search .................. 525/95, 285, 301, 71, 525/84, 83, 66; 524/504, 505

[56] References Cited

U.S. PATENT DOCUMENTS

| | | |
|---|---|---|
| 4,508,874 | 4/1985 | Hergenrother . |
| 4,529,632 | 7/1985 | Fujii et al. . |
| 4,578,429 | 3/1986 | Gergen et al. .................. 525/301 |
| 4,628,072 | 12/1986 | Shiraki et al. .................. 525/95 |

FOREIGN PATENT DOCUMENTS

| | | |
|---|---|---|
| 0193126 | 9/1986 | European Pat. Off. . |
| 2030992 | 4/1980 | United Kingdom . |
| 1577998 | 10/1980 | United Kingdom . |

OTHER PUBLICATIONS

Chemical Abstracts, vol. 92, No. 26, Jun. 1980, p. 51, No. 216493k.

*Primary Examiner*—Allan M. Lieberman
*Attorney, Agent, or Firm*—Arnold, White & Durkee

[57] ABSTRACT

A primer composition usable for steel sheet and plastic sheet in vehicle bodies consists essentially of a component A composed of a resin obtained by graft-polymerizing a styrene-butadiene-styrene block copolymer or its hydrogenated polymer with $\alpha,\beta$-unsaturated carboxylic acid or its anhydride, a component B of a crosslinking agent and a component C of an epoxy compound, and has particular weight ratios as solid content of component A to component B and components A+B to component C.

8 Claims, No Drawings

PRIMER COMPOSITIONS

BACKGROUND OF THE INVENTION

1. Field of the Invention

This invention relates to a primer composition adaptable for both steel sheet and plastic sheet as vehicle bodies.

2. Related Art Statement

In the painting of steel sheets and plastic sheets for vehicle bodies, there has hitherto been adopted a method wherein the painting is performed separately on every sheet and then the painted sheets are assembled at a final step.

The steel sheet is degreased and phosphated to form a phosphate layer thereon. After an under coat is formed by electrodeposition, a chipping primer or a stoneguard coat is partially applied and then an inter coat and a top coat are formed thereon.

In the formation of the inter coat, a chipping-resistant and corrosion-resistant inter coating consisting of a film forming resin composed mainly of an acidic resin having an acid value of 10~50, talc powder and rust-preventive pigment is applied in order to prevent rusting and corrosion even if the metal substrate is partially exposed by chipping, which is disclosed in Japanese Patent laid open No. 55-56,165.

On the other hand, the plastic sheet is degreased, dried and coated with an exclusive primer for the plastic sheet. Then, an exclusive inter coat and an exclusive top coat are successively formed thereon. In this case, the formation of the exclusive inter coat may be omitted.

As the exclusive primer, Japanese Patent Application Publication No. 51-36,285 discloses a primer composed of a reaction product between ungelled hydroxy-containing urethane reactant and polycarboxylic acid or its anhydride and an aminoplast resin for polyurethane resin used as a sheet material in automobile bumper or molded article.

Further, Japanese Patent laid open No. 59-30,830 discloses a primer consisting mainly of chlorinated polypropylene for polypropylene resin used as a sheet material in the automobile bumper.

Assuming that polyamide resin, polybutylene terephthalate resin, polycarbonate resin or the like is used as a top coat forming a hard painted coating on the steel sheet for the vehicle body, a primer composition for plastic parts comprising a resin obtained by grafting propylene-ethylene copolymer with maleic acid or maleic anhydride and a conductive substance is used as disclosed in Japanese Patent laid open No. 61-76,557.

Thereafter, the painted plastic sheet is assembled onto the painted steel sheet, which is transferred to a subsequent step.

In another painting method, the plastic sheet is degreased, dried, coated with the above exclusive primer, baked and then assembled onto the steel sheet previously degreased, phosphated and coated with an under coat, and thereafter the common inter coat and top coat are formed and baked on the assembly of the plastic sheet and steel sheet.

According to these conventional painting methods, however, the structure of the resulting paint coats is different between the plastic sheet and the steel sheet and the paint used and the painting step are also different, so that there are caused the following problems:

(1) Since the painting equipment must be separately arranged for the painting of steel sheet and for the painting of plastic sheet, not only the operation efficiency is poor but also the huge equipment investement is required;

(2) The difference in appearance such as color tone, gloss and the like is caused between the plastic sheet and the steel sheet to degrade the commercial value of the automobile as a whole;

(3) The difference in the durability of painted coating is caused between the plastic sheet and the steel sheet to injure the beautiful appearance of the automobile from a long-period viewpoint; and (4) When the plastic sheet is coated with the exclusive primer, assembled together with the steel sheet and then the resulting assembly is subjected to a painting together, the problems described in the above items (1)-(3) are avoided. The selection of paints for inter coat and top coat presents additional problems, in that when a soft coating is used in compliance with the plastic sheet, the weather resistance, polishing property, solvent resistance, stain resistance and the like are degraded, while when a hard coating is used in compliance with the steel sheet, the impact resistance, chipping resistance and the like on the plastic sheet are degraded.

Further, it has been attempted to examine various top coats suitable for both plastic sheet and steel sheet. However, there is still a problem that the performances such as polishing property, stain resistance and so on are not established with the performances for plastic sheet such as impact resistance, chipping resistance and so on.

SUMMARY OF THE INVENTION

The present invention relates to a primer composition consisting essentially of a resin obtained by graft-polymerizing styrene-butadiene-styrene block copolymer or its hydrogenated polymer with $\alpha,\beta$-unsaturated carboxylic acid or its anhydride, a crosslinking agent and an epoxy compound is applied onto the under coat formed by electrodeposition in case of the steel sheet and as a primer for plastic in case of the plastic sheet, whereby the simultaneous painting for inter coat and top coat as a hard coating used for steel sheet is possible and the aforementioned problems can be solved, and as a result the invention has been accomplished.

That is, the invention provides a primer composition consisting essentially of a resin obtained by graft-polymerizing a styrene-butadiene-styrene block copolymer or its hydrogenated polymer with $\alpha, \beta$-unsaturated carboxylic acid or its anhydride (component A), a crosslinking agent (component B) and an epoxy compound (component C), and having a weight ratio as solid content of component A to component B within a range of 99/1 ~ 60/40 and a weight ratio as solid content of components A+B to component C within a range of 100/1 ~ 100/50.

DESCRIPTION OF THE PREFERRED EMBODIMENTS

The production method of styrene-butadiene-styrene block copolymer used in the formation of the resin of component A according to the invention is wellknown in the art, a typical example of which is disclosed in U.S. Pat. No. 3,265,765. In general, this method includes solution polymerization of a mixture of aromatic monovinyl hydrocarbon monomer and conjugated diene monomer in the present of a catalyst having the general formula of $R(Li)x$, wherein x is an integer of 1~4 and R is a hydrocarbon residue selected from aliphatic, alicyclic and aromatic residues.

Further, the intermolecular double bonds of the styrene-butadiene-styrene block copolymer may be subjected to hydrogenation. The production of such a hydrogenated polymer is disclosed, for example, in Japanese Patent application publication No. 42-8,704, No. 43-6,636, No. 45-20,504, No. 48-3,555 and the like.

The component A used in the invention is obtained by graft-polymerizing the above styrene-butadiene-styrene block copolymer or its hydrogenated polymer with $\alpha,\beta$-unsaturated carboxylic acid or its anhydride in the presence of a radical polymerization initiator and is a resin having carboxyl group or its anhydride group in the molecule.

As the graft polymerization, there are a method wherein radical polymerization is performed by melting and kneading the mixture through an extruder, a method wherein the block polymer is dispersed in an aromatic hydrocarbon solvent such as toluene, xylene, benzene or the like containing the radical polymerization initiator and added with $\alpha,\beta$-unsaturated carboxylic acid or its anhydride and then heated to perform radical polymerization, and the like.

As the $\alpha,\beta$-unsaturated carboxylic acid, use may be made of acrylic acid, methacrylic acid, maleic acid, itaconic acid, citraconic acid, crotonic acid, fumaric acid and so on. When a polybasic acid such as maleic acid, fumaric acid or the like is used as $\alpha,\beta$-unsaturated carboxylic acid, it may be a half-alkyl ester.

In the graft polymerization, the other vinyl monomer such as acrylonitrile, acrylamide, vinyl chloride, 2-hydroxyethyl acrylate or the like may be used together with the $\alpha,\beta$-unsaturated carboxylic acid or its anhydride.

As the radical polymerization initiator, use may be made of any radical initiators usually used, a typical example of which includes organic peroxides, azonitriles and so on. As the organic peroxide, mention may be made of alkyl peroxide, aryl peroxide, acyl peroxide, aroyl peroxide, ketone peroxide, peroxy carbonate, peroxy carboxylate and the like. The alkyl peroxide includes diisopropyl peroxide, di-ter-butyl peroxide, tert-butyl hydroperoxide and so on. The aryl peroxide includes dicumyl peroxide, cumyl hydroperoxide, and so on. The acyl peroxide includes dilauroyl peroxide and so on. The aroyl peroxide includes dibenzoyl peroxide and so on. The ketone peroxide includes methylethylketone peroxide, cyclohexanone peroxide and so on. A the azonitrile, mention may be made of azobisisobutyronitrile, azobisisopropionitrile and the like.

In the component A, the $\alpha,\beta$-unsaturated carboxylic acid or its anhydride is preferably grafted in an amount of 0.05~10% by weight. When the amount is less than 0.05% by weight, the adhesion property between the primer and the coat formed thereon is poor, while when it exceeds 10% by weight, the humidity resistance is poor.

The cross-linking agent used as a component B in the invention includes (1) self-reaction type compounds, (2) polyisocyanate compounds and so on. As the self-reaction type compound (1), mention may be made of amino resins such as melamine resin and urea resin modified with an alcohol such as methanol, ethanol, n-butanol, isobutanol or the like; and acrylic resins obtained by copolymerizing a polymerizable unsaturated group containing compound (e.g. polyfunctional acrylates such as trimethylolpropane triacrylate, polyethylene glycol diacrylate, penthaerythritol triacrylate and so on; epoxy compounds esterified with acrylic or methacrylic acid; polyurethane acrylate or methacrylate obtained by reacting a polyisocyanate compound as mentioned below with acrylic or methacrylic acid; melamine acrylate or methacrylate obtained by reacting the above mentioned melamine resin with acrylic or methacrylic acid; and the like) with an acryl monomer having a functional group such as carboxyl group, hydroxyl group, amino group, methylol group or the like.

As the polyisocyanate compound (2), mention may be made of aromatic and aliphatic diisocyanates such as tolylene diisocyanate, 4,4'-diphenylmethane diisocyanate, isophorone diisocyanate, 1,6-hexamethylene diisocyanate, cyclohexane-1,4-diisocyanate and so on; addition products of the aromatic and aliphatic diisocyanate with diol, triol or the like; polyisocyanates such as chain trimers bonded through biuret reaction, cyclic trimers and so on; and blocked isocyanate compounds obtained by hindering a whole or a part of isocyanate groups contained in the aforementioned polyisocyanate compound with a blocking agent such as lower alcohol, $\epsilon$-caprolactam, methylethylketoxime, diethyl malonate, phenol or the like.

These crosslinking agents are used alone or in admixture.

Furthermore, the cross-linking agent may be used together with a resin having an active hydrogen-containing functional group such as carboxyl group, hydroxyl group, amino group, imino group or the like, e.g. acrylic resin, polyester resin, polyurethane resin and so on.

The epoxy compound used as a component C in the invention includes compounds having at least one epoxy group, preferably two or more epoxy groups in the molecule and a mixture thereof, e.g. polyglycidyl ethers of polyhydric phenols such as 2,2-bis(4-hydroxyphenyl)propane(bisphenol A), bis(4-hydroxyphenyl)methane, 1,1bis-(4-hydroxyphenyl)ethane and so on; polyglycidyl ethers of polyhydric alcohols such as glycerin, pentaerythritol, trimethylol propane and so on; diglycidyl ether of polyalkylene polyether; diglycidyl ester of polycarboxylic acid or a so-called dimer acid, and the like.

Further, the component C may include epoxy compounds obtained by oxidizing an olefin such as polybutadiene with a peracid; acrylic epoxy compounds obtained by copolymerizing the above epoxy compound with glycidyl acrylate or glycidyl methacrylate; novolak-type epoxy compound obtained by the reaction between phenol and formalin; and a modified compound thereof.

These epoxy compounds are used alone or in admixture.

In the primer composition according to the invention, the components A and B are mixed in a weight ratio as solid content of component A to component B of 99/1~60/40. When the ratio of component A to component B is greater than 99/1, the cross-linking effect is poor and the heating-cooling cycle property is degraded to decrease the flexibility of the resulting coating. The ratio of component A/component B is smaller than 60/40, the flexibility of the coating is decreased and also the chipping resistance on the steel sheet for vehicle body as well as the chipping resistance and impact resistance on the plastic sheet are poor.

Further, the component C is included in a weight ratio as solid content of components A+B/component C of 100/1~100/50. When the ratio of component C is greater than 100/1 the humidity resistance is poor. When the ratio is smaller than 100/50, the gasoline resistance is poor.

The primer composition according to the invention may contain a pigment. As the pigment, mention may be made of inorganic and organic pigments usually used in paint, such as titanium dioxide, carbon black, talc, kaolin, calcium carbonate, magnesium carbonate, barium sulfate, iron oxide, cyanine blue, quinacridone red and so on. In order to form the inter coat and top coat by electrostatic painting, it is favorable that the resulting coating has an electric conductivity. In this case, a conductive pigment, particularly conductive carbon black can be used, wherein the surface resistivity is usually suitable to be not more than $10^{10}$ $\Omega$·cm.

In the primer composition according to the invention, it is desirable that a ratio of pigment to components A+B+C is 0~2.0. When this ratio exceeds 2.0, the flexibility of the coating is poor, and the chipping resistance on the steel sheet and the chipping resistance and impact resistance on the plastic sheet are poor.

The usable organic solvent is enough to uniformly dissolve the resins and stably store them for a long-time period, and includes organic solvents for usual paint, e.g. aliphatic hydrocarbon solvents such as mineral spirit, n-hexane and so on, and aromatic hydrocarbon solvents such as toluene, xylene and so on.

In this case, the primer composition comprises 50~98% by weight of the organic solvent and 2~50% by weight of the resin components A, B and C.

If necessary, the primer composition according to the invention may be compounded with additives for paint such as surface regulating agent, antisettle agent, heat degradation preventing agent, light degradation preventing agent, pigment dispersing agent and the like as well as a reaction catalyst promoting the reaction.

The primer composition according to the invention may be produced by the usual paint manufacturing process or pigment dispersing process. When the primer composition does not contain a pigment, it can be produced by mixing the resins with, if necessary, additives for paint and organic solvent in the well-known agitating device such as dissolver to form a uniform resin solution. On the other hand, when the primer composition contains a pigment, it can be produced by dispersing the pigment into a part or whole of the resin in the well-known pigment dispersing machine such as attritor, sand mill or the like and then adding the remaining resin, organic solvent and additives for paint thereto so as to adjust the viscosity to a given value.

As a means for applying the primer composition according to the invention, use may be made of well-known painting methods such as air spraying, electrostatic air spraying, electrostatic spray painting and the like.

The primer composition according to the invention is simultaneously applicable to the steel sheet for vehicle body after the painting of under coat and the plastic sheet after the degreasing and drying. After the application of the primer composition, the primer coating is left to stand at room temperature for 1~10 minutes, or the forced drying is carried out at 80° C. for about 30 minutes. Then, inter coat and top coat usually used can be formed thereon.

Even when the primer composition is applied to both the steel sheet and plastic sheet, the painting of inter coat can be omitted, if necessary. As a paint for inter coat and top coat, there may be used paints usually used in the steel sheet for vehicle body and the plastic sheet.

As the plastic material applicable to the primer composition according to the invention, mention may be made of ones used as a plastic for vehicle body, such as polyamide resin, polybutylene terephthalate resin, polyurethane resin, polycarbonate resin, unsaturated polyester resin, polypropylene resin, a mixture thereof, a reinforced resin thereof and the like. However, the invention is not restricted to these resins as a plastic material.

Although the primer composition according to the invention has been described with respect to the painting of an automotive vehicle body, the primer composition is applicable to a combination of steel sheet and plastic sheet in other products.

As mentioned above, the primer composition according to the invention can simultaneously be applied to the steel sheet for vehicle body and the plastic sheet for vehicle body owing to the presence of the components A, B and C at a particular weight ratio, so that it is possible to simultaneously conduct the painting of the same hard inter coat and hard top coat to both the sheets in the same painting equipment and to effect the baking in the same baking furnace. Therefore, the uniformity of qualities in the painted coats on both the sheets, for example, appearance qualities such as color tone, gloss and the like and durability qualities such as weather resistance, chemical resistance and the like can be improved.

Further, when the primer composition according to the invention is applied to the undercoated steel sheet, the chipping resistance, adhesion property, humidity resistance, heating-cooling cycle property, gasoline resistance and the like are improved, while when it is applied to various plastic sheets for vehicle body, the chipping resistance, adhesion property, humidity resistance, heating-cooling cycle property, gasoline resistance, impact resistance and the like are improved.

The following examples are given in illustration of the invention and are not intended as limitations thereof. In the examples, all percentages are by weight, unless otherwise stated.

Resin I

Into a stainless pressure vessel provided with a thermometer and a stirrer were charged 1 l of xylene and 100 g of hydrogenated styrene-butadiene-styrene block copolymer (Kraton G-1652, trade name, made by Shell Chemical Corp.) and the interior of the vessel was urged with a nitrogen gas. After the temperature was raised to 125° C., a solution of maleic anhydride in xylene (maleic anhydride: 1 g/10 ml) and a solution of dicumyl peroxide in xylene (dicumyl peroxide: 0.15 g/ml) were supplied from separate conduits through pumps over 6 hours so as to add 6.0 g of maleic anhydride and 0.9 g of dicumyl peroxide to the reaction mixture. After the completion of the reaction, the reaction product was cooled to about room temperature and added with acetone, which was filtered to obtain a block copolymer grafted with maleic anhydride. This polymer was repeatedly precipitated with acetone and finally washed. After the washing, the precipitates were dried under a reduced pressure while temperature rising to obtain a white powdery modified resin having a solid content of 100%. As a result of infrared absorption spectrophotometry and neutralization titration, the content of maleic anhydride group in the modified resin was 3.4% by weight.

Resin II

Into a stainless pressure vessel provided with a thermometer and a stirrer were charged 1 l of xylene and 100 g of hydrogenated styrene-butadiene-styrene block copolymer, Kraton G-1652, and the interior of the vessel was purged with a nitrogen gas. After the temperature was raised to 125° C., a solution of maleic anhydride in xylene (maleic anhydride: 1 g/10 ml) and a solution of dicumyl peroxide in xylene (dicumyl peroxide: 0.15 g/ml) were supplied from separate conduits through pumps over 6 hours so as to add 0.08 g of maleic anhydride and 0.9 g of dicumyl peroxide to the reaction mixture. After the completion of the reaction, the reaction product was cooled to about room temperature and added with acetone, which was filtered to obtain a block copolymer grafted with maleic anhydride. This polymer was repeatedly precipitated with acetone and finally washed. After the washing, the precipitates were dried under a reduced pressure while temperature rising to obtain a white powdery modified resin having a solid content of 100%. As a result of infrared absorption spectrophotometry and neutralization titration, the content of maleic anhydride group in the modified resin was 0.05% by weight.

Resin III

Into a stainless pressure vessel provided with a thermometer and a stirrer were charged 1 l of xylene and 100 g of hydrogenated styrene-butadiene-styrene block copolymer, Kraton G-1652, and the interior of the vessel was purged with a nitrogen gas. After the temperature was raised to 125° C., a solution of maleic anhydride in xylene (maleic anhydride: 1 g/10 ml) and a solution of dicumyl peroxide in xylene (dicumyl peroxide: 0.15 g/ml) were supplied from separate conduits through pumps over 6 hours so as to add 12.0 g of maleic anhydride and 0.9 g of dicumyl peroxide to the reaction mixture. After the completion of the reaction, the reaction product was cooled to about room temperature and added with acetone, which was filtered to obtain a block copolymer grafted with maleic anhydride. This polymer was repeatedly precipitated with acetone and finally washed. After the washing, the precipitates were dried under a reduced pressure while temperature rising to obtain a white powdery modified resin having a solid content of 100%. As a result of infrared absorption spectrophotometry and neutralization titration, the content of maleic anhydride group in the modified resin was 9.9% by weight.

Resin IV

Into a stainless pressure vessel provided with a thermometer and a stirrer were charged 1 l of xylene and 100 g of hydrogenated styrene-butadiene-styrene block copolymer, Kraton G-1652, and the interior of the vessel was purged with a nitrogen gas. After the temperature was raised to 125° C., a solution of maleic anhydride in xylene (maleic anhydride: 1 g/10 ml) and a solution of dicumyl peroxide in xylene (dicumyl peroxide: 0.15 g/ml) were supplied from separate conduits through pumps over 6 hours so as to add 14.5 g of maleic anhydride and 0.9 g of dicumyl peroxide to the reaction mixture. After the completion of the reaction, the reaction product was cooled to about room temperature and added with acetone, which was filtered to obtain a block copolymer grafted with maleic anhydride. This polymer was repeatedly precipitated with acetone and finally washed. After the washing, the precipitates were dried under a reduced pressure while temperature rising to obtain a white powdery modified resin having a solid content of 100%. As a result of infrared absorption spectrophotometry and neutralization titration, the content of maleic anhydride group in the modified resin was 11.0% by weight.

Resin V

The hydrogenated styrene-butadiene-styrene block copolymer, Kraton G-1652, was used alone.

Examples 1~3, Comparative Examples 1~7

(Production of primer)

A primer composition having a compounding recipe as shown in the following Table 1 was prepared as follows. That is, a component A was added with a whole amount of xylene and dissolved in a dissolver, to which were added components B and C and a pigment to obtain 100 g of a compounding composition. The resulting composition was thoroughly kneaded in a dissolver and admixed in a paint shaker for 1 hour and then added with an equal mixed solution of xylene and toluene so as to adjust a spraying viscosity to 13 seconds (20° C.) as Ford cup No. 4.

The details of components shown in Table 1 are as follows.

Blocked isocyanate compound:
 Coronate 2507 (trade name, made by Nippon Polyurethane Industry Co., Ltd., solid content: 75%)

Polyisocyanate compound:
 Sumidul N-75 (trade name, made by Sumitomo Bayer Urethane Co., Ltd., solid content: 75%, trimer of 1,6-hexamethylene diisocyanate)

Isobutylated melamine resin:
 Super Bekamin L-116-70 (trade name, made by Nippon Riech Hold Co., Ltd., solid content: 70%)

Bisphenol A-type epoxy compound:
 Epikote 834 (trade name, made by Yuka Shell Epoxy Co., Ltd., solid content: 100%)

Novolak type epoxy compound:
 Epototo YDN-180 (made by Toto Kasei K.K., solid content: 100%)

Polyglycidyl ether type epoxy compound of polyhydric alcohol:
 Epicron 707 (trade name, made by Dainippon Ink and Chemicals, Inc., solid content: 100%)

Titanium dioxide:
 Taipake R-830 (trade name, made by Ishihara Sangyo K.K.)

Carbon black:
 Mitsubishi Carbon MA-11 (trade name, made by Mitsubishi Chemicals, Inc.)

Conductive carbon black:
 Conductex 975 (trade name, made by Columbian Carbon, Japan)

TABLE 1

| Primer composition | Example | | | | | | | | | |
|---|---|---|---|---|---|---|---|---|---|---|
|  | 1 | 2 | 3 | 4 | 5 | 6 | 7 | 8 | 9 | 10 |
| Component A |  |  |  |  |  |  |  |  |  |  |
| Resin I (3.4%)* | 10.6 |  |  | 10.6 | 10.6 | 10.6 | 10.6 | 13.2 | 7.5 | 13.1 |

TABLE 1-continued

| Primer composition | | | | | | | | | | |
|---|---|---|---|---|---|---|---|---|---|---|
| Resin II (0.05%)* | 10.6 | | | | | | | | | |
| Resin III (9.9%)* | | 10.6 | | | | | | | | |
| Resin IV (11.0%)* | | | | | | | | | | |
| Resin V (0%)* | | | | | | | | | | |
| Component B | | | | | | | | | | |
| blocked isocyanate compound | 2.5 | 2.5 | 2.5 | | | 2.5 | 2.5 | | | 3.1 |
| polyisocyanate compound | | | | 2.5 | | | | | | |
| isobutylated melamine resin | | | | | 2.7 | | | 0.2 | 7.1 | |
| Component C | | | | | | | | | | |
| bisphenol A-type epoxy compound | 3.1 | 3.1 | 3.1 | 3.1 | 3.1 | | | 3.3 | 3.1 | 0.2 |
| novolak type epoxy compound | | | | | | 3.1 | | | | |
| polyglycidyl ether type epoxy compound of polyhydric alcohol | | | | | | | 3.1 | | | |
| Pigment | | | | | | | | | | |
| titanium dioxide | 9.0 | 9.0 | 9.4 | 9.4 | 8.4 | 9.4 | 9.4 | | 9.4 | 9.0 |
| carbon black | 0.4 | 0.4 | 0.4 | 0.4 | | 0.4 | 0.4 | | 0.4 | 0.4 |
| conductive carbon black | | | | | 1.0 | | | 3.3 | | |
| Solvent, xylene | 74.4 | 74.4 | 74.4 | 74.4 | 73.1 | 74.4 | 74.4 | 79.9 | 69.6 | 74.2 |
| component A/component B | 85/15 | 85/15 | 85/15 | 85/15 | 85/15 | 85/15 | 85/15 | 99/1 | 60/40 | 85/15 |
| components A + B/component C | 100/25 | 100/25 | 100/25 | 100/25 | 100/25 | 100/25 | 100/25 | 100/25 | 100/25 | 100/1 |
| pigment/components A + B + C | 0.6 | 0.6 | 0.6 | 0.6 | 0.6 | 0.6 | 0.6 | 0.2 | 0.6 | 0.6 |

| Primer composition | Example | | | Comparative Example | | | | | | |
|---|---|---|---|---|---|---|---|---|---|---|
| | 11 | 12 | 13 | 1 | 2 | 3 | 4 | 5 | 6 | 7 |
| Component A | | | | | | | | | | |
| Resin I (3.4%)* | 10.6 | 10.2 | 7.1 | | | 12.5 | 6.9 | 13.3 | 8.6 | 7.1 |
| Resin II (0.05%)* | | | | | | | | | | |
| Resin III (9.9%)* | | | | | | | | | | |
| Resin IV (11.0%)* | | | | 10.6 | | | | | | |
| Resin V (0%)* | | | | | 10.6 | | | | | |
| Component B | | | | | | | | | | |
| blocked isocyanate compound | 2.5 | 2.4 | 1.7 | 2.5 | 2.5 | | | | | 1.7 |
| polyisocyanate compound | | | | | | | | | | |
| isobutylated melamine resin | | | | | | | 8.1 | 3.4 | 2.1 | |
| Component C | | | | | | | | | | |
| bisphenol A-type epoxy compound | | 3.0 | 2.1 | 3.1 | 3.1 | 3.1 | 3.1 | | 5.5 | 2.1 |
| novolak type epoxy compound | 6.3 | | | | | | | | | |
| polyglycidyl ether type epoxy compound of polyhydric alcohol | | | | | | | | | | |
| Pigment | | | | | | | | | | |
| titanium dioxide | 9.5 | | 19.5 | 9.0 | 9.0 | 9.0 | 9.0 | 9.0 | 9.0 | 20.6 |
| carbon black | | | 1.5 | 0.4 | 0.4 | 0.4 | 0.4 | 0.4 | 0.4 | 1.5 |
| conductive carbon black | 1.8 | | | | | | | | | |
| Solvent, xylene | 69.3 | 84.4 | 68.1 | 74.4 | 74.4 | 75.0 | 69.3 | 72.6 | 73.5 | 67.8 |
| component A/component B | 85/15 | 85/15 | 85/15 | 85/15 | 85/15 | 100/0 | 55/45 | 85/15 | 85/15 | 85/15 |
| components A + B/component C | 100/50 | 100/25 | 100/25 | 100/25 | 100/25 | 100/25 | 100/25 | 100/0 | 100/55 | 100/25 |
| pigment/components A + B + C | 0.6 | 0 | 2.0 | 0.6 | 0.6 | 0.6 | 0.6 | 0.6 | 0.6 | 2.1 |

(Note) *content of maleic anhydride group in resin (%)

(Painting of steel sheet)

A cold rolled steel sheet of 0.8 mm × 70 mm × 150 mm was subjected to a phosphating treatment with Bonderite #3004 (trade name, made by Nihon Parkerizing Co., Ltd.), coated with a cation electropaint of Power Top U-100 (trade name, made by Nippon Paint Co., Ltd.) as an under coat and then dried by baking at 175° C. for 20 minutes. The dried thickness of the resulting electrocoating was 20 μm.

Then, each of the aforementioned primer compositions was applied by an air spray painting process, and thereafter Epico No. 1500 Sealer TM-2 (trade name, made by Nippon Oil and Fats Co., Ltd.) was applied as an amino/oil-free polyester resin series inter coat of wet-on-wet system by an air spray painting process and dried by baking at 140° C. for 30 minutes. The dried thickness of the primer was 5~8 μm, and that of the inter coat was 30~35 μm.

Next, an amino/alkyd resin series solid color of Melami No. 1500 Black (trade name, made by Nippon Oil and Fats Co., Ltd.) was applied as a top coat by an air spray painting process and dried by baking at 140° C. for 30 minutes. The dried thickness of the top coat was 40 μm.

(Painting of plastic sheet)

I. Plastic sheet
  (A) Polyamide resin sheet (PA) 1013 RW-1 (trade name, made by Ube Industries, Ltd.)
  (B) Polybutylene terephthalate resin sheet (PBT) 5201X11 (trade name, made by Toray Industries, Inc.)
  (C) Unsaturated polyester resin sheet (SMC) N12 (trade name, made by Takeda Chemical Industries, Ltd.)
  (D) Polyurethane resin sheet (PU) C1056/FA720 (trade name, made by Nippon Polyurethane Industry Co., Ltd.)
  (E) Polycarbonate resin sheet (PC) Yupiron MB-2201 (trade name, made by Mitsubishi Gas Chemical Company, Inc.
  (F) Polypropylene resin sheet (PP) Mitsubishi Noblen BC5D (trade name, made by Mitsubishi Yuka K.K., propylene-ethylene block copolymer)

II. Painting process

Each of the above plastic sheets having a size of 3 mm×70 mm×150 mm was degreased with a vapor of 1,1,1-trichloroethane (74° C.) for 60 seconds, dried, coated with the aforementioned primer by an air spray painting process, and then coated with Epico No. 1500 Sealer TM-2 as an amino/oil free polyester resin series inter coat of wet-on-wet system by an air spray painting process, which was then dried by baking at 140° C. for 30 minutes. The dried thickness of the primer was 5~8 ~m, and that of the inter coat was 30~35 μm. Thereafter, the amino/alkyd resin paint of Melami No. 1500 Black was applied as a top coat by an air spray painting process and dried by baking at 140° C. for 30 minutes. The dried thickness of the top coat was 40 μm.

Comparative Example 8

The same procedure as described in Example 1 was repeated except that the application of the primer composition was omitted.

Comparative Example 9

Into a vessel purged with a nitrogen gas were charged 200 g of ethylene-propylene copolymer having an ethylene content of 70 mol% and a number average molecular weight of 15,000, 6.0 g of maleic acid and 0.3 g of 2,5-dimethyl-2,5-di(tert-butyl peroxy) hexine-3 with stirring, which were kneaded in a uniaxial type kneader at 250° C. for 50 seconds and then added with 2,500 g of toluene to obtain a polymer of ethylenepropylene copolymer grafted with maleic acid having a solid content of 8%.

98 g of the resulting graft polymer and 2 g of conductive carbon black (Conductex 950, trade name, made by Columbian Carbon, Japan) were thoroughly kneaded in a dissolver and admixed in a paint shaker for 1 hour. The resulting mixture was added with toluene so as to adjust a spraying viscosity to 13 seconds (20° C.) as Ford cup No. 4, whereby a primer composition was produced.

This primer composition was applied by the same painting method as in the above item H to obtain a test sheet, wherein the dried thickness of primer was 7 μm, that of inter coat was 33 μm and that of top coat was 40 μm.

The following tests were made with respect to the coating on the steel sheet and plastic sheet to obtain results as shown in the following Table 2. (Test and evaluation methods)

1. Chipping resistance
  Testing machine: gravelometer made by Suga Ski-kenki K. K.
  Testing stone: No. 7 hard pulverized sand (diameter:2~3 mm) 100 g/test
  Air pressure blown: 4 kg/cm$^2$
  Blowing angle: 90°
  Sheet temperature: 20° C.

The test was made under the above conditions to evaluate the peeling state of the coating (CP-I) and the number of rusting points generated (CP-II).
Evaluation standard of CP-I:

Peeling diameter of less than 0.5 mm, O (excellent)
Peeling diameter of not less than 0.5 mm but less than 1.0 mm, Δ(acceptable)
Peeling diameter of not less than 1.0 mm, × (bad)

The evaluation of CP-II was made by the number of rusting points generated after 72 hours by spraying salt (5% salt water, temperature: 35° C.) to the test sheet.
Rust number of less than 20, O (excellent)
Rust number of not less than 20 but less than 50, Δ(acceptable)
Rust number of not less than 50, × (bad)

2. Adhesion property

Eleven lines were drawn on the test sheet in length and width at an internal of 1 mm by means of a cutter knife so as to have a depth reaching the sheet material, and then cellophane tapes were adhered to the resulting 100 measures. Thereafter, these tapes were peeled off at once to measure the number of remaining measures for the evaluation of adhesion property. The evaluation standard was O (100/100, excellent), Δ (99/100~80/100, good), × (79/100~50/100, bad) and ×× (49/100~0/100, considerably bad).

3. Humidity resistance

After the test sheet was placed in a closed box adjusted to a temperature of 50±1° C. and a relative humidity of not less than 98% for 240 hours, the presence of blister in the appearance of the coating was observed for the evaluation of humidity resistance. The evaluation standard was O (no blistering, excellent), Δ (presence of blister having a diameter of less than 0.2 mm, acceptable) and × (presence of blister having a diameter of not less than 0.2 mm, unacceptable).

4. Heating-cooling cycle property

A cross cut of 50 mm×50 mm was formed on the test sheet, which was subjected to a cycle of heating at 50° C. and 95% RH for 16 hours→cooling at 20° C. for 0.5 hour→cooling at −40° C. for 3 hours→cooling at 20° C. for 1 hour→heating at 80° C. for 3 hours→cooling at 20° C. for 0.5 hour three times to evaluate the presence of cracks in the coating.

The evaluation standard was as follows.
Absence of crack O (excellent)
Presence of cracks × (bad)

5. Gasoline resistance

The test sheet was immersed in gasoline for 1 hour to evaluate color change, swelling, peeling and the like of the coating. The evaluation standard was O (no change; excellent), Δ (slightly change; acceptable) and × (considerably change; bad).

6. Impact resistance at low temperature (High-speed impact test)

A value of impact energy when a point of impact shot through the test sheet was measured by means of a high-speed impact testing machine made by Rheometric Corporation under such conditions that a tip diameter of impact point was 1.6 cm (⅝ inch), a holder was 5.1 cm (2 inch) and an impact speed was 11.1 m/sec., from which a yield energy value (joule) at −40° C. was calculated.

The larger the numerical value, the better the impact resistance at low temperature.

TABLE 2

| Sheet material | Test items | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| | chipping resistance CP-I | O | O | O | O | O | O | O | O | O | O | O |
| | chipping resistance CP-II | O | O | O | O | O | O | O | O | O | O | O |

TABLE 2-continued

| Sheet material | Test items | | | | | | | | | | | |
|---|---|---|---|---|---|---|---|---|---|---|---|---|
| Steel sheet | adhesion property | O | O | O | O | O | O | O | O | O | O | O |
| | humidity resistance | O | O | O | O | O | O | O | O | O | O | O |
| | heating-cooling cycle property | O | O | O | O | O | O | O | O | O | O | O |
| | gasoline resistance | O | O | O | O | O | O | O | O | O | O | O |
| | chipping resistance CP-I | O | O | O | O | O | O | O | O | O | O | O |
| PA | adhesion property | O | O | O | O | O | O | O | O | O | O | O |
| | humidity resistance | O | O | O | O | O | O | O | O | O | O | O |
| | heating-cooling cycle property | O | O | O | O | O | O | O | O | O | O | O |
| | gasoline resistance | O | O | O | O | O | O | O | O | O | O | O |
| | impact resistance at low temperature (joule) | 10~12 | 10~12 | 10~12 | 10~12 | 10~12 | 10~12 | 10~12 | 10~12 | 10~12 | 10~12 | 10~12 |
| | chipping resistance CP-I | O | O | O | O | O | O | O | O | O | O | O |
| PBT | adhesion property | O | O | O | O | O | O | O | O | O | O | O |
| | humidity resistance | O | O | O | O | O | O | O | O | O | O | O |
| | heating-cooling cycle property | O | O | O | O | O | O | O | O | O | O | O |
| | gasoline resistance | O | O | O | O | O | O | O | O | O | O | O |
| | impact resistance at low temperature (joule) | 40~50 | 40~50 | 40~50 | 40~50 | 40~50 | 40~50 | 40~50 | 40~50 | 40~50 | 40~50 | 40~50 |
| | chipping resistance CP-I | O | O | O | O | O | O | O | O | O | O | O |
| SMC | adhesion property | O | O | O | O | O | O | O | O | O | O | O |
| | humidity resistance | O | O | O | O | O | O | O | O | O | O | O |
| | heating-cooling cycle property | O | O | O | O | O | O | O | O | O | O | O |
| | gasoline resistance | O | O | O | O | O | O | O | O | O | O | O |
| | impact resistance at low temperature (joule) | 10~20 | 10~20 | 10~20 | 10~20 | 10~20 | 10~20 | 10~20 | 10~20 | 10~20 | 10~20 | 10~20 |
| | chipping resistance CP-I | O | O | O | O | O | O | O | O | O | O | O |
| PU | adhesion property | O | O | O | O | O | O | O | O | O | O | O |
| | humidity resistance | O | O | O | O | O | O | O | O | O | O | O |
| | heating-cooling cycle property | O | O | O | O | O | O | O | O | O | O | O |
| | gasoline resistance | O | O | O | O | O | O | O | O | O | O | O |
| | impact resistance at low temperature (joule) | 30~40 | 30~40 | 30~40 | 30~40 | 30~40 | 30~40 | 30~40 | 30~40 | 30~40 | 30~40 | 30~40 |
| | chipping resistance CP-I | O | O | O | O | O | O | O | O | O | O | O |
| PC | adhesion property | O | O | O | O | O | O | O | O | O | O | O |
| | humidity resistance | O | O | O | O | O | O | O | O | O | O | O |
| | heating-cooling cycle property | O | O | O | O | O | O | O | O | O | O | O |
| | gasoline resistance | O | O | O | O | O | O | O | O | O | O | O |
| | impact resistance at low temperature (joule) | 40~50 | 40~50 | 40~50 | 40~50 | 40~50 | 40~50 | 40~50 | 40~50 | 40~50 | 40~50 | 40~50 |
| | chipping resistance CP-I | O | O | O | O | O | O | O | O | O | O | O |
| PP | adhesion property | O | O | O | O | O | O | O | O | O | O | O |
| | humidity resistance | O | O | O | O | O | O | O | O | O | O | O |
| | heating-cooling cycle property | O | O | O | O | O | O | O | O | O | O | O |
| | gasoline resistance | O | O | O | O | O | O | O | O | O | O | O |
| | impact resistance at low temperature (joule) | 30~40 | 30~40 | 30~40 | 30~40 | 30~40 | 30~40 | 30~40 | 30~40 | 30~40 | 30~40 | 30~40 |

| Sheet material | Test items | Example | | Comparative Example | | | | | | | | |
|---|---|---|---|---|---|---|---|---|---|---|---|---|
| | | 12 | 13 | 1 | 2 | 3 | 4 | 5 | 6 | 7 | 8 | 9 |
| Steel sheet | chipping resistance CP-I | O | O | O | O | O | x | O | O | x | Δ | O |
| | chipping resistance CP-II | O | O | O | O | O | x | O | O | x | Δ | O |
| | adhesion property | O | O | O | x | O | O | O | O | O | O | O |
| | humidity resistance | O | O | x | O | O | O | x | O | O | O | O |
| | heating-cooling cycle property | O | O | O | O | x | O | O | O | O | O | x |
| | gasoline resistance | O | O | O | O | O | O | O | x | O | O | O |
| PA | chipping resistance CP-I | O | O | O | O | O | x | O | O | x | x | O |
| | adhesion property | O | O | O | x | O | O | O | O | O | x | O |
| | humidity resistance | O | O | x | O | O | O | x | O | O | x | O |
| | heating-cooling cycle property | O | O | O | O | x | O | O | O | O | x | x |
| | gasoline resistance | O | O | O | O | O | O | O | x | O | x | O |
| | impact resistance at low temperature (joule) | 10~12 | 10~12 | 10~12 | 10~12 | 10~12 | <9 | 10~12 | 10~12 | <9 | 10~12 | 10~12 |
| PBT | chipping resistance CP-I | O | O | O | O | O | x | O | O | x | x | O |
| | adhesion property | O | O | O | x | O | O | O | O | O | x | O |
| | humidity resistance | O | O | x | O | O | O | x | O | O | x | O |
| | heating-cooling cycle property | O | O | O | O | x | O | O | O | O | x | x |
| | gasoline resistance | O | O | O | O | O | O | O | x | O | x | O |
| | impact resistance at low temperature (joule) | 40~50 | 40~50 | 40~50 | 40~50 | 40~50 | <9 | 40~50 | 40~50 | <9 | 40~50 | 40~50 |
| SMC | chipping resistance CP-I | O | O | O | O | O | x | O | O | x | x | O |
| | adhesion property | O | O | O | x | O | O | O | O | O | x | O |
| | humidity resistance | O | O | x | O | O | O | x | O | O | x | O |
| | heating-cooling cycle property | O | O | O | O | x | O | O | O | O | x | x |
| | gasoline resistance | O | O | O | O | O | O | O | x | O | x | O |
| | impact resistance at low temperature (joule) | 10~20 | 10~20 | 10~20 | 10~20 | 10~20 | <9 | 10~20 | 10~20 | <9 | 10~20 | 10~20 |
| PU | chipping resistance CP-I | O | O | O | O | O | x | O | O | x | x | O |
| | adhesion property | O | O | O | x | O | O | O | O | O | x | O |
| | humidity resistance | O | O | x | O | O | O | x | O | O | x | O |
| | heating-cooling cycle property | O | O | O | O | x | O | O | O | O | x | x |
| | gasoline resistance | O | O | O | O | O | O | O | x | O | x | O |

TABLE 2-continued

| | | | | | | | | | | | |
|---|---|---|---|---|---|---|---|---|---|---|---|
| PC | impact resistance at low temperature (joule) | 30~40 | 30~40 | 30~40 | 30~40 | 30~40 | <9 | 30~40 | 30~40 | <9 | 30~40 | 30~40 |
| | chipping resistance CP-1 | O | O | O | O | O | x | O | O | x | x | O |
| | adhesion property | O | O | O | x | O | O | O | O | O | x | O |
| | humidity resistance | O | O | x | O | O | O | x | O | O | x | O |
| | heating-cooling cycle property | O | O | O | O | x | O | O | O | O | x | x |
| | gasoline resistance | O | O | O | O | O | O | O | x | O | x | O |
| PU | impact resistance at low temperature (joule) | 40~50 | 40~50 | 40~50 | 40~50 | 40~50 | <9 | 40~50 | 40~50 | <9 | 40~50 | 40~50 |
| | chipping resistance CP-1 | O | O | O | O | O | x | O | O | x | x | O |
| | adhesion property | O | O | O | x | O | O | O | O | O | x | O |
| | humidity resistance | O | O | x | O | O | O | x | O | O | x | O |
| | heating-cooling cycle property | O | O | O | O | x | O | O | O | O | x | x |
| | gasoline resistance | O | O | O | O | O | O | O | x | O | x | O |
| | impact resistance at low temperature (joule) | 30~40 | 30~40 | 30~40 | 30~40 | 30~40 | <9 | 30~40 | 30~40 | <9 | 30~40 | 30~40 |

As seen from the results of Table 2, the use of the primer composition according to the invention is excellent in the chipping resistance, adhesion property, humidity resistance, heating-cooling cycle property and gasoline resistance for the steel sheet and excellent in the chipping resistance, adhesion property, humidity resistance, heating-cooling cycle property, gasoline resistance and impact resistance at low temperature for all plastic sheets, so that it can ensure the good balance of total film performances required as a paint for automobiles.

On the contrary, Comparative Example 1 is poor in the humidity resistance for the steel sheet and all plastic sheets because the amount of maleic anhydride to be grafted exceeds 10% in the component A.

In Comparative Example 2, since $\alpha,\beta$-unsaturated carboxylic acid or its anhydride is not grafted in the component A, the adhesion property is poor for the steel sheet and all plastic sheets.

Since Comparative Example 3 does not use the component B, the heating-cooling cycle property is poor for the steel sheet and all plastic sheets.

In Comparative Example 4, since the ratio of component B exceeds 40, the chipping resistance for the steel sheet and the chipping resistance and impact resistance at low temperature for all plastic sheets are poor.

Since Comparative Example 5 does not use the component C, the humidity resistance is poor for the steel sheet and all plastic sheets.

In Comparative Example 6, since the ratio of component C exceeds 50, the gasoline resistance is poor for the steel sheet and all plastic sheets.

In Comparative Example 7, since the ratio of pigment/components A+B+C exceeds 2.0, the chipping resistance for the steel sheet and the chipping resistance and impact resistance at low temperature for all plastic sheets are poor.

In Comparative Example 8, the chipping resistance for the steel sheet and the chipping resistance, adhesion property, humidity resistance, heating-cooling cycle property and gasoline resistance for all plastic sheets are poor because the primer composition according to the invention is no used.

Since Comparative Example 9 corresponds to Example 3 described in Japanese Patent laid open No. 61-76,557, the heating-cooling cycle property is poor for the steel sheet and all plastic sheets.

What is claimed is:

1. A primer composition consisting essentially of a resin obtained by graft-polymerizing a styrene-butadiene-styrene block copolymer or its hydrogenated polymer with $\alpha,\beta$-unsaturated carboxylic acid or its anhydride (component A), a crosslinking agent selected from the group consisting of self-reactive type compounds and polyisocyanate compounds together with a resin having an active hydrogen-containing functional group (component B) and an epoxy compound (component C), and having a weight ratio as solid content of component A to component B within a range of 99/1~60/40 and a weight ratio as solid content of components A+B to component C within a range of 100/1~10/50, wherein said $\alpha,\beta$-unsaturated carboxylic acid or its anhydride is contained in said component A in an amount of 0.05 10% by weight.

2. The primer composition according to claim 1, wherein said $\alpha,\beta$-unsaturated carboxylic acid is selected from the group consisting of acrylic acid, methacrylic acid, maleic acid, itaconic acid, citraconic acid, crotonic acid and fumaric acid.

3. The primer composition according to claim 1, wherein said anhydride of $\alpha,\beta$-unsaturated carboxylic acid is maleic anhydride.

4. The primer composition according to claim 1, wherein said component C is selected from the group consisting of epoxy compounds containing at least one epoxy group in molecule and mixtures thereof.

5. The primer composition according to claim 1, wherein said primer composition further contains a pigment at a ratio of pigment to components A+B+C of not more than 2.0.

6. The primer composition according to claim 1, wherein said primer composition further contains 50~98% by weight of an organic solvent.

7. The primer composition according to claim 1, wherein said self-reactive type compound is selected from the group consisting of alkanol-modified amino resins and acrylic resins.

8. The primer composition according to claim 1, wherein said polyisocyanate compound is selected from the group consisting of aromatic and aliphatic diisocyanates, addition products of these diisocyanates, chain or cyclic trimers, and blocked isocyanate compounds.

* * * * *